W. W. CASE.
ROCKET.
APPLICATION FILED JUNE 15, 1918.
1,376,797.
Patented May 3, 1921.
2 SHEETS—SHEET 1.
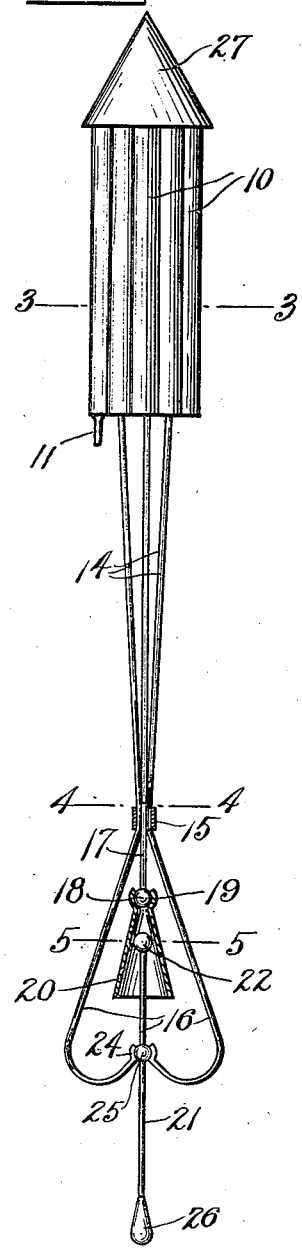
Fig. 1.
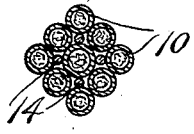
Fig. 3.
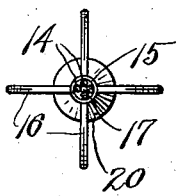
Fig. 4.
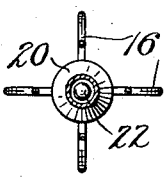
Fig. 5.
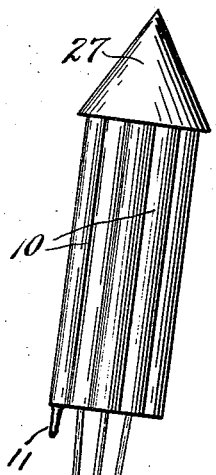
Fig. 2.
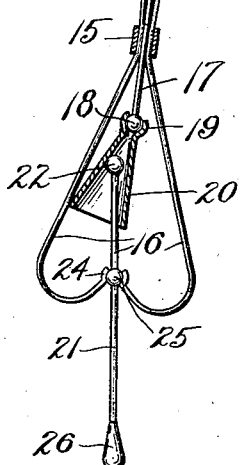
William W. Case, Inventor
By his Attorney
Frank J. Cent W. W. CASE.
ROCKET.
APPLICATION FILED JUNE 15, 1918.
1,376,797.
Patented May 3, 1921.
2 SHEETS—SHEET 2.
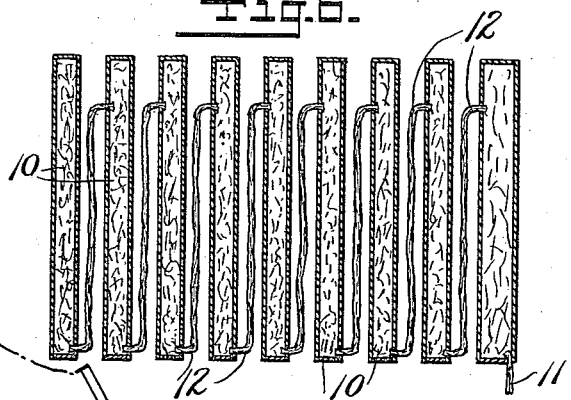
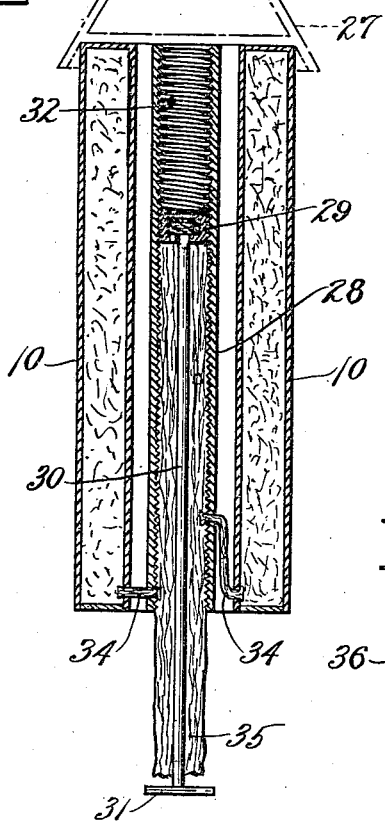
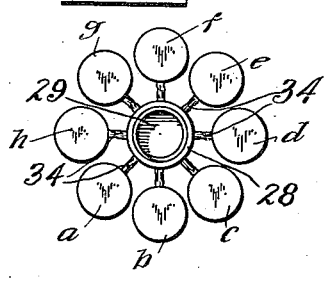
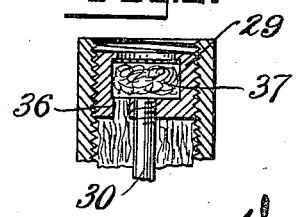

UNITED STATES PATENT OFFICE.

WILLIAM W. CASE, OF FRENCHTOWN, NEW JERSEY, ASSIGNOR TO WILLIAM H. FULPER, OF FLEMINGTON, NEW JERSEY.

ROCKET.

1,376,797.

Specification of Letters Patent.  Patented May 3, 1921.

Application filed June 15, 1918. Serial No. 240,166.

*To all whom it may concern:*

Be it known that I, WILLIAM W. CASE, a citizen of the United States, residing at Frenchtown, in the county of Hunterdon and State of New Jersey, have invented certain new and useful Improvements in Rockets, of which the following is a specification.

This invention relates to improvements in rockets, for use in warfare, for illuminating purposes, for sending aloft fire-brands, charges of asphyxiating gas or the like.

One of the objects of the invention is to provide a rocket with a plurality of tubes or cylinders of propelling explosive, and incidentally to allow for the control of these cylinders so that one or more of them may be rendered inoperative, whereby the distance to which the rocket is propelled may be predetermined.

Another object is to provide a rocket with an inertia controlled steering device whereby variations from its intended path of self-propelled flight may be corrected.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification, and in which I have shown clearly a preferred form of embodiment of the invention, Figure 1 is an elevation of a rocket embodying my invention, parts being shown in section; Fig. 2 is a similar view, but showing a different position of the parts comprising the steering mechanism; Fig. 3 is a sectional view taken on the line 3—3 of Fig. 1; Fig. 4 is a sectional view taken on the line 4—4 of Fig. 1; Fig. 5 is a sectional view taken on the line 5—5 of Fig. 1; Fig. 6 is a diagrammatic view showing an arrangement for communicating the igniting flame from one cylinder to another; Fig. 7 is a sectional view of a modification illustrating how the igniting flame may be communicated in sequence to the cylinders from a central igniting member, and illustrating also how one or more of the cylinders may be rendered inoperative; Fig. 8 is a top view of the subject-matter of Fig. 7, with the rocket head removed; Fig. 9 is an enlarged sectional view of the forward end of the central ignition and control tube.

Referring to the numerals on the drawings, there is shown in Fig. 1 a plurality of cylinders 10, united in any preferred way, each containing a propelling explosive. One of these cylinders may be ignited by means of a depending fuse 11, as illustrated in diagram in Fig. 6, and as the charge of that cylinder is burned out and reaches the upper end of the cylinder the flame is communicated to another fuse 12, which extends to the outside of the first cylinder at the upper end thereof, and down to and into the lower end of the next cylinder; and so on from cylinder to cylinder. Preferably the first cylinder is arranged centrally, with the other cylinders disposed around about it as shown in Fig. 3. A plurality of rods 14 depends from the rear end of the rocket, the forward ends of these rods being held between the central cylinder and the surrounding cylinders as shown in Fig. 3. Rearwardly these rods converge and are held together by means of a ring 15, and beyond this ring 15 certain of the rods 14 diverge to form a frame or cage 16. One of the rods indicated at 17 in Fig. 1 has at its end a ball 18 which fits in a socket 19 forming the small end of a hollow cone 20. Into the open end of this cone 20 extends one end of a rod 21, a ball 22 being provided to bear against the inner walls of the cone. This rod 21 is supported from a socket 24 formed by the meeting ends of the inturned end portions of the rods 14, a ball 25 being provided on the rods 14 to engage with the socket 24. The rod 21 to engage with the socket 24. The other end of the rod 21 is provided with a weight 26. The effect of this construction is as follows. Supposing that the rocket has been fired, with an initial vertical direction. If for any reason it should deflect from the vertical, as indicated for instance in Fig. 2, the rod 21, by reason of the universal joint formed by the ball 25 and socket 24, will tend to remain vertical, because of the weight 26. Consequently the other end of the rod 21, that is the ball 22, being in contact with the inner surface of the cone 20, will move the cone from the Fig. 1 position to the Fig. 2 position, and the cone will thereupon act as a rudder and bring the rocket back to the vertical as it continues its flight.

The head 27 of the rocket will contain illuminating material for instance, which may be ignited in any suitable way from the last propelling cylinder, so that the illumination takes place at or about the time the rocket reaches its upward limit of travel. Or the head may contain a charge of asphyxiating gas, to be released in any suitable way during the progress of the consumption of the contents of the last cylinder. Or the head may be arranged to discharge in the same way, a number of floating flaming or incandescent fire-brands, which are intended to catch on the winged surfaces of aeroplanes or the like.

Instead of the arrangement thus far described for accomplishing the ignition of the several cylinders, I may use the scheme shown in Fig. 7. Here the central cylinder indicated at 28 is an interiorly threaded tube, in which travels a nut 29 under control of a rod 30 having a handle 31 at its outer end. In the side walls of the tube 28 are a number of openings 32, from which extend fuses 34 leading into the interior lower ends of the several surrounding cylinders 10. Depending from the rear side of the nut 29 and surrounding the rod 30 is an ignition wick or fuse 35, and this fuse leads also through an opening 36 in the back wall of the nut into a chamber 37 in the forward end of the nut, in which may be located an explosive charge, for instance T. N. T., which when set off sends a flame through the forward open end of the cylinder 28 to explode whatever charge there is in the head 27. It will be seen that by manipulating the rod 30 the nut 29 may be raised or lowered within the cylinder 28, thus cutting out one or more of the propelling cylinders, so that the final explosion of the head may be calculated to take place at any particular height desired. Assuming that the rocket includes eight propelling cylinders I have shown in Fig. 8 an example of the sequence in which they might be fired, the order of firing being indicated by $a$, $b$, $c$, $d$, $e$, $f$, $g$, $h$ appearing on the several cylinders in that figure.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. A rocket having a head containing a destructive charge and a plurality of cylinders connected to the head, each cylinder containing explosive to be ignited for the propulsion of the rocket, and means for firing the cylinders in sequence.

2. A rocket having a head containing a destructive charge and a plurality of propulsion cylinders connected to the head, each cylinder containing explosive to be ignited for the propulsion of the rocket, means for firing the cylinders in sequence, and means for firing the destructive charge in the head upon the explosion of the propulsion cylinders.

3. A rocket of the kind described, having a head provided with a destructive charge, a plurality of cylinders connected to the head, each cylinder containing explosive to be ignited for the propulsion of the rocket, means for firing the cylinders in sequence, and means for cutting out a particular cylinder when the rocket has traveled a predetermined distance.

4. A rocket provided with a plurality of explosive cylinders, means for firing the cylinders in sequence, said rocket having inertia controlled means suspended therefrom consisting of a swinging member arranged to assume a perpendicular position for returning and holding the rocket in its same general direction of flight during the explosion of said cylinders.

5. A rocket having a head containing a destructive charge and a plurality of cylinders arranged parallel to each other beneath the head each cylinder containing explosive to be ignited for the propulsion of the rocket and means for firing the cylinders in sequence.

6. A rocket having a head and a plurality of cylinders disposed beneath the head and about the longitudinal axis of the rocket each cylinder containing explosive to be ignited for the propulsion of the rocket, means for firing the cylinders in sequence and means for righting the rocket during the explosion of the several cylinders.

7. A rocket having a head containing a destructive charge and a plurality of cylinders connected to the head each containing explosive to be ignited for the propulsion of the rocket, means for igniting the contents of the propulsion cylinders in sequence, a plurality of rods connected to and depending from said cylinders and means suspended from said rods for holding the rocket in a vertical path.

In testimony whereof I affix my signature.

WILLIAM W. CASE.